United States Patent [19]
Peter et al.

[11] Patent Number: 5,210,240
[45] Date of Patent: May 11, 1993

[54] PROCESS FOR THE EXTRACTION OF OIL CONTAINING VEGETABLE MATERIALS

[76] Inventors: Siegfried Peter, Lindenweg 3, 8525 Uhenreuth-Weiher; Gerd Brunner, Wallersbacher, Weg 3, 8542 Roth 3, both of Fed. Rep. of Germany

[21] Appl. No.: 933,594

[22] Filed: Aug. 20, 1992

Related U.S. Application Data

[63] Continuation of Ser. No. 702,353, May 15, 1991, abandoned, which is a continuation of Ser. No. 570,962, Aug. 21, 1990, abandoned, which is a continuation of Ser. No. 456,580, Dec. 26, 1989, abandoned, which is a continuation of Ser. No. 265,331, Oct. 24, 1988, abandoned, which is a continuation of Ser. No. 124,436, Nov. 23, 1987, abandoned, which is a continuation of Ser. No. 764,222, Aug. 9, 1985, abandoned.

[30] Foreign Application Priority Data

Aug. 9, 1984 [DE] Fed. Rep. of Germany ..... 34294163

[51] Int. Cl.$^5$ ............................. C09F 5/00; C11B 1/00
[52] U.S. Cl. ......................................... 554/11; 554/9; 554/179; 554/180; 554/187
[58] Field of Search ................. 554/8, 9, 11, 179, 180, 554/187

[56] References Cited
PUBLICATIONS

Stahl et al, "Extraction of Seed Oils ... Dioxide", Agricultural and Food Chemistry, (1980), 28, No. 6, pp. 1153–1157.

Brunner et al, "Phase Equilibria in Ternary and Quaternary Systems of Hydrogen, Water, ... ", Sep. Sci. Technol., (1982), 17, 1, pp. 199–214.

Primary Examiner—Arthur C. Prescott
Attorney, Agent, or Firm—Kenyon & Kenyon

[57] ABSTRACT

A process for the extraction of oils from oil-containing solid vegetable material by means of compressed gases, wherein said vegetable material is extracted with a mixture consisting of a supercritical gas and a subcritical entraining agent selected from the group consisting of propane, butane, pentane, ethanol, ethyl acetate, formaldehydedimethylacetal, $CHF_2Cl$ and mixtures thereof, wherein the conditions of pressure, temperature and composition are selected so as to form a single fluid phase in said mixture of oil, supercritical gas and subcritical entraining agent, said extraction resulting in a loaded extractant which is separated from the extracted material in a separator and converted into an oil-rich liquid phase and a gaseous oil-exhausted phase in a regenerator by temperature increase and/or pressure decrease and said oil-rich phase and said oil-exhausted phase are separated and the oil-rich phase is pressure relieved, whereupon, if desired, the entraining agent remaining in the obtained oil is recovered.

16 Claims, No Drawings

PROCESS FOR THE EXTRACTION OF OIL CONTAINING VEGETABLE MATERIALS

This application is a continuation of application Ser. No. 07/702,353, filed May 15, 1991, now abandoned; which is continuation of Ser. No. 07/570,962, filed Aug. 21, 1990, abandoned; which is a continuation of Ser. No. 07/456,580, filed Dec. 26, 1989, now abandoned; which is a continuation of Ser. No. 07/265,331, filed Oct. 24, 1988, now abandoned; which is a continuation of Ser. No. 07/124,436, filed Nov. 23, 1987, now abandoned; which is a continuation of Ser. No. 06/764,222, filed Aug. 9, 1985, now abandoned.

BACKGROUND OF THE INVENTION

This invention relates to a process for the extraction of oil from oil-containing vegetable materials, in particular oil seed, such as soybeans or rape seed.

It is known to extract oil-containing solids by use of liquid solvents, such as hexane, after a disintegration treatment. In the case of seeds which are particularly rich in oil it is suitable to effect a previous mechanical oil removal by pressing. A disadvantage of this type of extraction is the removal of the liquid solvent from the residue and the extract. This removal is costly and incomplete, leading to solvent losses. Furthermore, it was found that hexane can extract, in addition to glycerides, many substances which accompany the fat, such as phosphatides and which have to be removed separately.

The separation of the residue and the extractant is improved in the so-called gas-extraction in which a super-critical gas is used as the extractant, and the separation of the extracted oil is achieved by a modification of density by pressure relief and/or temperature increase. In the gas-extraction, carbon dioxide or ethene may be used in super-critical state. Although carbon dioxide is physiologically acceptable and non-burnable it has a relatively low solubility for glycerides so that high pressures, such as about 700 bar, have had to be used to obtain a sufficiently short extraction time. Although ethane is a better solvent for glycerides than carbon dioxide, said extractant is also not satisfying. When ethane or any other gaseous extractant is used, the separation of the extracted oil has to be achieved by an essential reduction of its density for which purpose a temperature increase or a decrease of pressure are suitable. A pressure relief is much more effective, all the more, because the temperature stability of the oil to be obtained is limited. However, in that process, the pressure of the extractant has to be reduced substantially (in many cases at least to half the value of the starting pressure), whereupon the extractant has to be recompressed to the starting pressure.

SUMMARY OF THE INVENTION

An object of the present invention is the provision of a process enabling an operation at relatively low pressure in which process it is possible to separate the extracted vegetable oils from the extractant by a relatively minor pressure relief. Furthermore, any change of temperature effected during the extraction process shall remain within relatively narrow limits. It is another object to load the extractant with a high concentration of vegetable oils so that the amount of extractant remains as small as possible.

The subject matter of the invention is a process for the extraction of oil from oil-containing vegetable materials by means of compressed gases which process is characterized in that said vegetable materials are extracted with a one-phase mixture of a super-critical gas and a sub-critical entraining agent, the conditions of pressure, temperature and composition of the mixture consisting of compressed gas and entraining agent, which mixture serves as extractant, being chosen so that the oil to be extracted is miscible with the extractant in any ratio; thereafter the loaded extractant is separated from the extracted solids in a separator and converted into an oil-rich liquid phase and a gaseous oil-exhausted phase in a regenerator by temperature increase and/or pressure decrease, said phases are separated, and the oil-rich phase is pressure-relieved, whereupon, if desired, the entraining agent remaining in the obtained oil is recovered.

Thus, according to the invention a further sub-critical component, i.e., an entraining agent, is used besides the super-critical gas in the extraction, whereby it is possible to decrease the extraction pressure substantially. Even if the vapor pressure of the entraining agent is relatively low, the removal of the entraining agent from the obtained oil may be effected easily and completely, because the super-critical component which is released from the solution, when the pressure drops, essentially carries off the entraining agent. The selection of the entraining agent concentration as well as of the conditions of pressure and temperature for each particular case is done—if desired after the respective preliminary tests—in a way so that the mixture consisting of the oil to be extracted, which oil usually is a triglyceride, the entraining agent, and the compressed super-critical gas is a one-phase mixture. By this technique the amount of cycling solvent may be kept low, and the operation is economically advantageous. Furthermore, under these extraction conditions the binary system of entraining agent and super-critical component are miscible in any ratio. Thus, the system is one phase. If for instance soybean oil is to be treated with an extractant consisting of propane and carbon dioxide, it has been found that at 50° C. and a pressure of 300 bar the is miscible in any ratio if the ratio of propane to carbon dioxide is 1:2. If the content of entraining agent in the extractant is increased, the pressure at which a complete miscibility between the soybean oil and the extractant occurs decreases. With constant composition of the extractant the pressure at which a complete miscibility between oil and extractant occurs decreases with decreasing temperature.

According to the invention, it was also found that a relatively minor temperature increase of about 30° to 50° C. with constant pressure leads to the separation of the extractant, which has been freed from solids, into a liquid oil-rich phase and a gaseous oil-exhausted phase. Thus, such separation can be easily accomplished with a constant pressure. The recovered extractant is suitably returned after having been reconverted into the state, e.g., by a respective temperature decrease.

The above mentioned conversion of the one-phase system into two phases, e.g., by heating, is particularly effective if, with given pressure and given temperature, the extractant consisting of super-critical compressed gas and entraining agent possesses a content of entraining agent which is only inessentially higher than the content at which the vegetable oil becomes miscible with the extractant in any ratio.

If, for example, the 1.1 to 4 fold of the critical pressure of the super-critical component is used and the employed temperature is in the range between the critical temperature of the super-critical component and the critical temperature of the entraining agent, the following relations exist:

There is a miscibility gap between the vegetable oil and the super-critical component of the extractant. With increasing content of entraining agent said miscibility gap becomes smaller, and finally disappears at a certain content of entraining agent at the chosen conditions of pressure and temperature. Then the extractant is miscible with the oil in any ratio.

As stated above, the conditions of temperature, pressure and composition for the extraction are chosen so that the mixture consisting of vegetable oil, entraining agent and super-critical component forms a single fluid phase containing larger amounts of oil. When effecting the extraction process according to the present invention the oil-containing solids are separated from said fluid phase. The formation of two phases from the remaining fluid phase is effected by temperature increase and/or pressure decrease. It is of advantage that there is only a temperature increase, the pressure remaining unchanged.

As stated above, the resulting oil-rich liquid phase is withdrawn and pressure-relieved. The gas and entraining agent obtained in this pressure-relief is suitably led back. It is separated or repressurized into the super-critical state together with the gas obtained from the regenerator. The oil dissolved in the entraining agent may also be recovered, e.g., by temperature increase.

Of course, in a continuous process, that portion of entraining agent and gas which is carried off with the oil should be replaced.

Suitable temperatures for the extraction, of course, depend on the nature of the super-critical gas and the entraining agent which are used. The temperatures are between 20° and 90° C., preferably between 35° and 60° C., while suitable pressures are between 50 and 500 bar, preferably between 80 and 300 bar.

Examples of super-critical gases which may be used according to the invention are $CO_2$, $NO_2$, ethane, $CHF_3$, $CF_3$, ethylene, methane, $CF_3Cl$, $C_2F_6$, $SF_6$ or mixtures of two or more of said gases.

Examples of entraining agents which may be used according to the invention are propane, butane, pentane, $CHFCl_2$, $CHF_2Cl$, $CH_2Cl$, dimethylether, methanol, ethanol, acetone, ethylacetate, ethylformate, formaldehyde dimethylacetal, methylethylether, diethylether or mixture of two or more of said gases.

DETAILED DESCRIPTION OF THE INVENTION

In a specific embodiment of the process according to the invention, carbon dioxide is used as the super-critical component and propane is used as the entraining agent. Temperatures of 35° to 60° C. and pressures of 80 to 300 are used for the extraction.

Another embodiment uses as the super-critical component carbon dioxide and as the entraining agent $CHFCl_2$. Temperatures of 35° to 60° C. and pressures of 80 to 300 bar are used for the extraction.

Yet another embodiment of the claimed process using ethane as the super-critical component and $CHFCl_2$ as the entraining agent is advantageous while using temperatures of 35° to 60° C. and pressures of 80 to 300 bar.

In the first mentioned embodiment of the process of the present invention, for instance, a mixture consisting of 30 to 70 percent of carbon dioxide and 70 to 30 percent of propane may be used as extractant. Said mixture of extractants is used at the stated temperature range of 35° to 60° C. with a pressure in the range of 100 to 300 bar for the extraction. The extraction may be carried out with a residence time of the solids of 15 to 45 minutes. In the regenerator (i.e., a second pressure vessel) a temperature in the range of 70° to 120° C. is used resulting in a liquid oil-rich phase and a gaseous oil-exhausted phase. Then, the oil-rich phase is withdrawn from the pressure vessel and pressure-relieved obtaining the desired oil.

As already pointed out above, the extraction process of the present invention shows a series of substantial advantages. It may be carried out at a relatively low pressure, and the pressure changes during the extraction process are kept within narrow limits. The one-phase system with the super-critical component may be converted into a system having two phases by a relatively minor temperature increase. As the extractant consisting of super-critical component and entraining agent is able to absorb a high portion of vegetable oil the amount of extractant may be kept low. Furthermore the extraction system used according to the invention is extremely flexible and may be adapted exceptionally well to the conditions of any particular individual case. The oils to be extracted are treated very mildly by the extraction process of the invention, especially with regard to the necessary temperatures of the process. Finally the separation of the oil from the solids is extremely effective, the extraction times being very short.

The following examples serve to further illustrate the process of the present invention without restricting said process.

EXAMPLE 1

Rape seed which has been previously de-oiled having a residual oil content of about 25 weight % is introduced into a pressure vessel in an amount of 250 g, and a gas mixture consisting of carbon dioxide and propane (of each 50 weight %) is blown through it at a temperature of 51.5° C. and a pressure of 300 bar with a quantitative stream of 500 $l_N$/15 minutes. Then the loaded extractant is heated to 105° C. and the separating oil is collected. After 20 minutes the extract amounts to 52 g.

EXAMPLE 2

The above material is extracted with a gas mixture consisting of 39 weight % of $CO_2$ and 61 weight % of $CHF_2Cl$ at 52° C. and 155 bar. Then the extracted phase is heated to 105° C. With an amount of starting material of 329 g and a quantitative gas stream of 500 $l_N$/15 minutes the amount of extract is 85 g.

EXAMPLE 3

A 250-g sample of soybean powder is introduced into pressure vessel, and 33 $l_N$/minute of a gas mixture consisting of 50 weight % of $CO_2$ and 50 weight % of propane is blown through at a temperature of 50° C. and a pressure of 300 bar. The loaded extraction gas is then heated to 105° C. and the separated oil collected. After 45 minutes 51.5 g of oil are obtained.

What is claimed is:

1. A process for the extraction of oils from oil-containing solid vegetable material by means of compressed gases, wherein said vegetable material is extracted with a mixture consisting of a supercritical gas and a subcritical entraining agent selected from the group consisting of propane, butane, pentane, ethanol, ethyl acetate, formaldehydedimethylacetal, $CHF_2Cl$ and mixtures thereof, wherein the conditions of pressure, temperature and composition are selected so as to form a single fluid phase in said mixture of oil, supercritical gas and subcritical entraining agent, said extraction resulting in a loaded extractant which is separated from the extracted material in a separator and converted into an oil-rich liquid phase and a gaseous oil-exhausted phase in a regenerator by temperature increase and/or pressure decrease and said oil rich phase and said oil-exhausted phase are separated and the oil-rich phase is pressure relieved, whereupon, if desired, the entraining agent remaining in the obtained oil is recovered.

2. The Process according to claim 1, wherein the gaseous phase separated in the regenerator is reconverted into the super-critical state by temperature decrease and/or pressure increase and recycled.

3. The Process according to claim 1, wherein the gaseous phase obtained after pressure-relief is again recycled after it has been reconverted into the super-critical state by pressure increase and/or temperature decrease either per se or together with the gaseous phase separated in the regenerator.

4. The Process according to claim 1, wherein the extraction is effected in a mixing vessel outside the separator.

5. The Process according to claim 1, wherein the extraction is effected at temperatures between 20° and 90° C., preferably between 35° and 60°, and pressures between 50 and 500 bar, preferably between 80 and 300 bar.

6. The Process according to claim 1 wherein said super-critical gas is selected from the group consisting of $CO_2$, $N_2O$, ethane, $CHF_3$, $CF_4$, ethylene, $CH_4$, $CF_3Cl$, $C_2F_6$, $SF_6$ and mixtures thereof.

7. The Process according to claim 1 wherein said super-critical component is carbon dioxide, said entraining agent is propane, said temperature is in the range of from about 35° to about 60° C. and said pressure is in the range of from about 80 to about 300 bar.

8. The Process according to claim 1, wherein said super-critical component is carbon dioxide, said entraining agent is $CHF_2Cl$, said temperature is in the range of from about 35° to about 60° C. and said pressure is in the range of from about 80 to about 300 bar.

9. The Process according to claim 1 wherein said super-critical component is ethane, said entraining agent is butane, said temperature is in the range of from about 35° to about 60° C. and said pressure is in the range of from about 80 to about 300 bar.

10. A process for the extraction of oils from oil-containing solid vegetable material by means of compressed gases, wherein said vegetable material is extracted with a mixture consisting of supercritical $CO_2$ and a subcritical entraining agent selected from the group consisting of propane and butane and mixtures thereof, wherein the conditions of pressure, temperature and composition are selected so as to form a single fluid phase in said mixture of oil, supercritical gas and subcritical entraining agent, said extraction resulting in a loaded extractant which is separated from the extracted material in a separator and converted into an oil-rich liquid phase and a gaseous oil-exhausted phase in a regenerator by temperature increase and/or pressure decrease and said oil-rich phase and said oil-exhausted phase are separated and the oil-rich phase is pressure relieved, whereupon, if desired, the entraining agent remaining in the obtained oil is recovered.

11. The process according to claim 10 wherein the gaseous phase separated in the regenerator is reconverted into a supercritical state by temperature decrease and/or pressure increase and recycled.

12. The process according to claim 10 wherein the gaseous phase obtained after pressure relief is again recycled after it has been reconverted into the supercritical state by pressure increase and/or temperature decrease either per se or together with the gaseous phase separated in the regenerator.

13. The process according to claim 10 wherein the extraction is effected in a mixing vessel outside the separator.

14. The process according to claim 10 wherein the extraction is effected at a temperature in a range from about 35° to about 60° C., and pressures in a range of from about 80 to about 300 bar.

15. The process according to claim 10 wherein said entraining agent is propane, said temperature is in the range from about 35° to about 60° C. and said pressure is in the range of from about 80 to 300 bar.

16. The process according to claim 10 wherein said entraining agent is butane, said temperature is in the range from about 35° to about 60° C. and said pressure is in the range of from about 80 to 300 bar.

* * * * *